United States Patent [19]

Hashimoto et al.

[11] Patent Number: 4,468,710
[45] Date of Patent: Aug. 28, 1984

[54] DIGITAL VIDEO RECORDER

[75] Inventors: Yoshitaka Hashimoto, Chofu; Kaichi Yamamoto, Zama; Norihisa Shirota, Atsugi, all of Japan

[73] Assignee: Sony Corporation, Tokyo, Japan

[21] Appl. No.: 252,086

[22] Filed: Apr. 8, 1981

[30] Foreign Application Priority Data

Apr. 11, 1980 [JP] Japan .................... 55-48480

[51] Int. Cl.³ ............................. H04N 5/91
[52] U.S. Cl. .................. 360/9.1; 360/19.1; 360/33.1; 358/343
[58] Field of Search .................. 360/19, 8, 9, 38, 36, 360/33, 32, 33.1, 9.1, 38.1, 36.1, 36.2; 358/343; 179/15.55 T; 381/29, 34

[56] References Cited

U.S. PATENT DOCUMENTS

| | | | |
|---|---|---|---|
| 3,758,711 | 9/1973 | Crosno | 360/36 |
| 3,921,132 | 11/1975 | Baldwin | 360/32 |
| 4,063,290 | 12/1977 | Metildi | 360/9 |
| 4,118,738 | 10/1978 | Arnstein | 360/36.2 |
| 4,150,397 | 4/1979 | Russell | 360/9 |
| 4,303,950 | 12/1981 | Taniguchi | 360/23 |
| 4,353,098 | 10/1982 | Heinz | 360/19.1 |

Primary Examiner—Alan Faber
Attorney, Agent, or Firm—Lewis H. Eslinger; Alvin Sinderbrand

[57] ABSTRACT

A digital video and audio data recording and/or reproducing apparatus includes a plurality of rotary magnetic heads provided in association with a tape guide drum assembly having a periphery about which a magnetic tape is helically transported at a predetermined wrap angle, a time compressing circuit for time compressing digitized audio and video data, a multiplexing circuit for mixing the digitized audio and video data to form a mixed signal, a processing circuit for processing the mixed signal, and a signal distributing circuit for supplying the processed mixed signal to each of the rotary magnetic heads so that the latter record the processed mixed signal on the magnetic tape.

11 Claims, 22 Drawing Figures

F/G. 2

DIGITAL VIDEO RECORDER

BACKGROUND OF THE INVENTION

1. Field of the Invention

The present invention relates generally to a recording and/or reproducing apparatus and, more particularly, is directed to a recording and/or reproducing apparatus in which a color video signal and an associated audio signal are digitized and recorded by a plurality of rotary magnetic heads in a time sharing manner.

2. Description of the Prior Art

As well known in the art, a video signal is usually frequency-modulated and then recorded on and reproduced from a video magnetic tape. Recently, digital video processing has become popular with studio equipment, so that such digitization is also required in a VTR (video tape recorder).

Without going into detail, the digital VTR has many advantages. However, high density recording is required in such VTR and to this end various recording systems for such high density recording have been developed.

At present, however, the main investigation is directed only to the digital recording of a video signal, and almost no investigation has been directed to an audio signal.

In a certain experimental VTR, an audio signal is recorded on a longitudinal audio track in the same manner as in a conventional analog VTR. Further, in some digital VTR systems, a digitized audio signal and a digitized video signal are recorded by rotary magnetic heads in which the respective signals are separately processed. For example, (1/10) of each of the tracks is alloted to the digitized audio signal. In this system, since the audio and video signals are separately processed, the signal processing and associated hardware become complicated.

OBJECTS AND SUMMARY OF THE INVENTION

Accordingly, it is an object of the invention to provide a novel digitized video and audio data recording and/or reproducing apparatus that avoids the above-described difficulties encountered with the prior art.

Another object of the invention is to provide a digitized video and audio data recording and/or reproducing apparatus in which audio data is also recorded and/or reproduced by rotary magnetic heads.

In accordance with an aspect of the present invention, a digitized video and audio data recording and/or reproducing apparatus, includes
 a plurality of rotary magnetic heads provided in association with a tape guide drum assembly having a periphery about which a magnetic tape is helically transported at a predetermined wrap angle;
 time compressing means for time compressing digitized audio and video data;
 multiplexing means for mixing said digitized audio data and video data to form a mixed signal
 processing means for processing the mixed signal; and
 distributing means for supplying said processed mixed signal to each of said rotary magnetic heads so that the latter record the processed mixed signal on the magnetic tape.

The above, and other, objects, features and advantages of the present invention will become apparent from the following description of the invention taken in conjunction with the accompanying drawings.

DETAILED DESCRIPTION OF THE PREFERRED EMBODIMENTS

Figure 1:
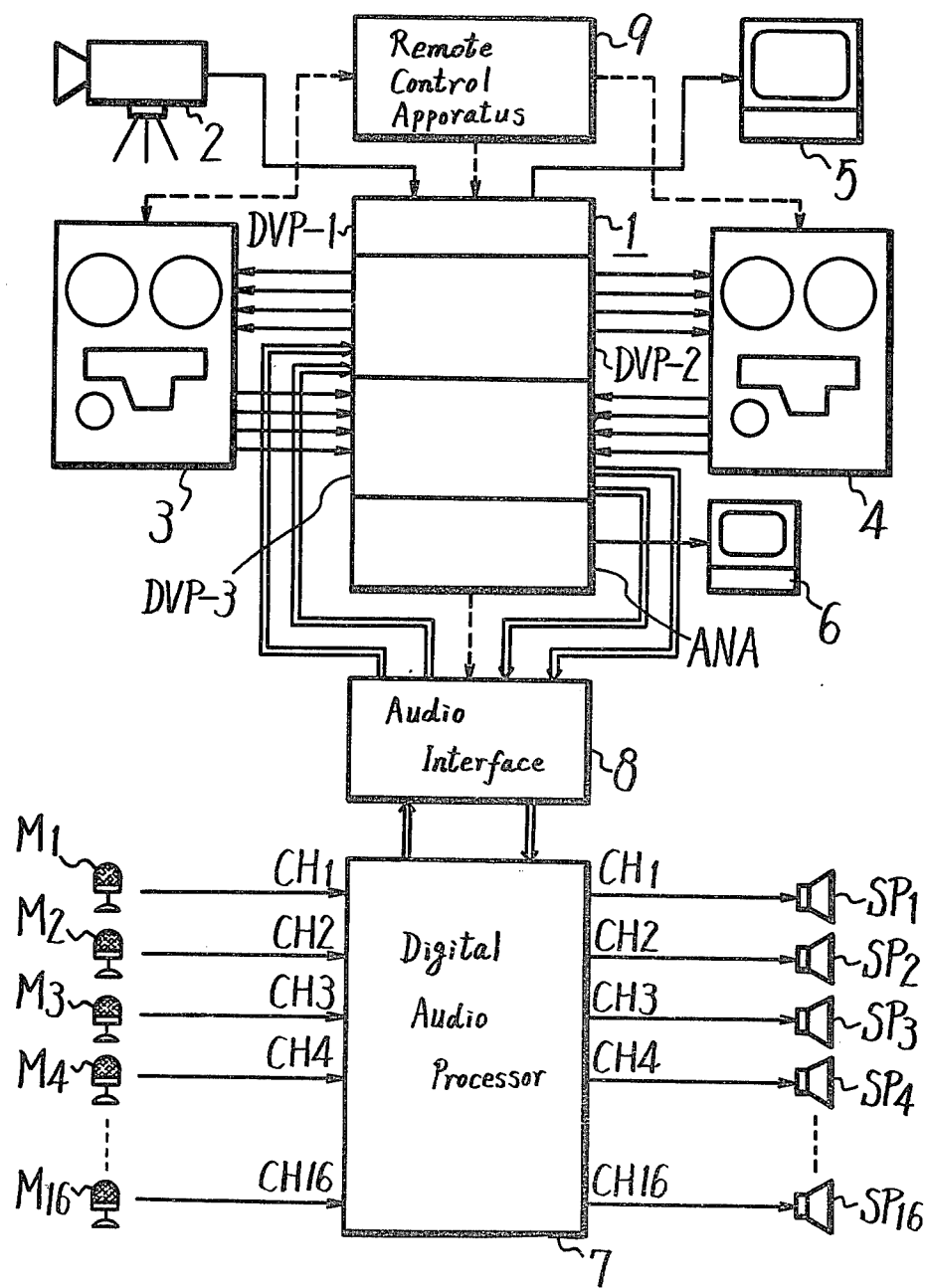
FIG. 1 is a block diagram of a video and audio data recording and reproducing apparatus according to one embodiment of the present invention.

Referring to the drawings in detail, and initially to FIG. 1 thereof, there is shown a digital video and audio information signal recording and/or reproducing apparatus according to one embodiment of this invention which is adapted to perform an editing function.

In the apparatus of FIG. 1, a digital video processor 1 is provided, which is comprised of a first processor DVP-1 including an A-D (analog-to-digital) converter, a D-A (digital-to-analog) converter and a signal generator for generating various kinds of clock and timing signals, a second processor DVP-2 for processing digitized video signals for recording, a third processor DVP-3 for processing reproduced digital video signals, and a data analyzer ANA having an error display function.

The apparatus also includes a television camera 2, and VTRs (video tape recorders) 3 and 4 which differ somewhat from conventional VTRs in their head mechanism and the associated circuit portions thereof.

A monitor television receiver 5 for displaying the reproduced video signal, and a monitor television receiver 6 for displaying an error by way of the data analyzer ANA are also provided. Further, a digital audio processor 7, which is made of a slightly modified PCM (pulse code modulation) adaptor that has been developed, is utilized when an audio signal is converted to a PCM signal and then recorded and/or reproduced by a VTR.

An audio interface 8 is used to couple the digital video processor 1 to digital audio processor 7. In the present embodiment, the maximum number of channels used for the audio signals is selected as 16 channels $CH_1$ to $CH_{16}$, whereby a maximum of 16 pairs of microphones $M_1$ to $M_{16}$ and respective speakers $SP_1$ to $SP_{16}$ can be connected.

Further, a remote control apparatus 9 is provided for producing remote conrol signals to control digital video processor 1, VTRs 3 and 4, digital audio processor 7 from a remote location.

When a color video signal is digitized and then recorded by a single rotary magnetic head, the bit rate of the recording signal is very high, and accordingly, tape consumption also is great. Therefore, digitized video signals are divided into a plurality of channels, and then recorded by a plurality of rotary magnetic heads on a tape in a multi-track pattern.

According to one embodiment of this invention, as shown in FIG. 1, the color video signal is converted to a digital signal, and the digitized data in each horizontal television line is distributed to an A-channel, B-channel, C-channel and D-channel. The digital signals of these four channels are supplied to either VTR 3 or 4 and recorded by four rotary magnetic heads in four parallel tracks for each television field. In this case, the audio signal is also converted into a digital signal, a predetermined data group of the digitizeed audio signal is added to the digital video signal for each predetermined sample group of the digital video signal, and is then recorded in the above four tracks in combination with the video signal.

The recording and/or reproducing system for the color video signal and audio signal will now be described in detail.

Figure 2:
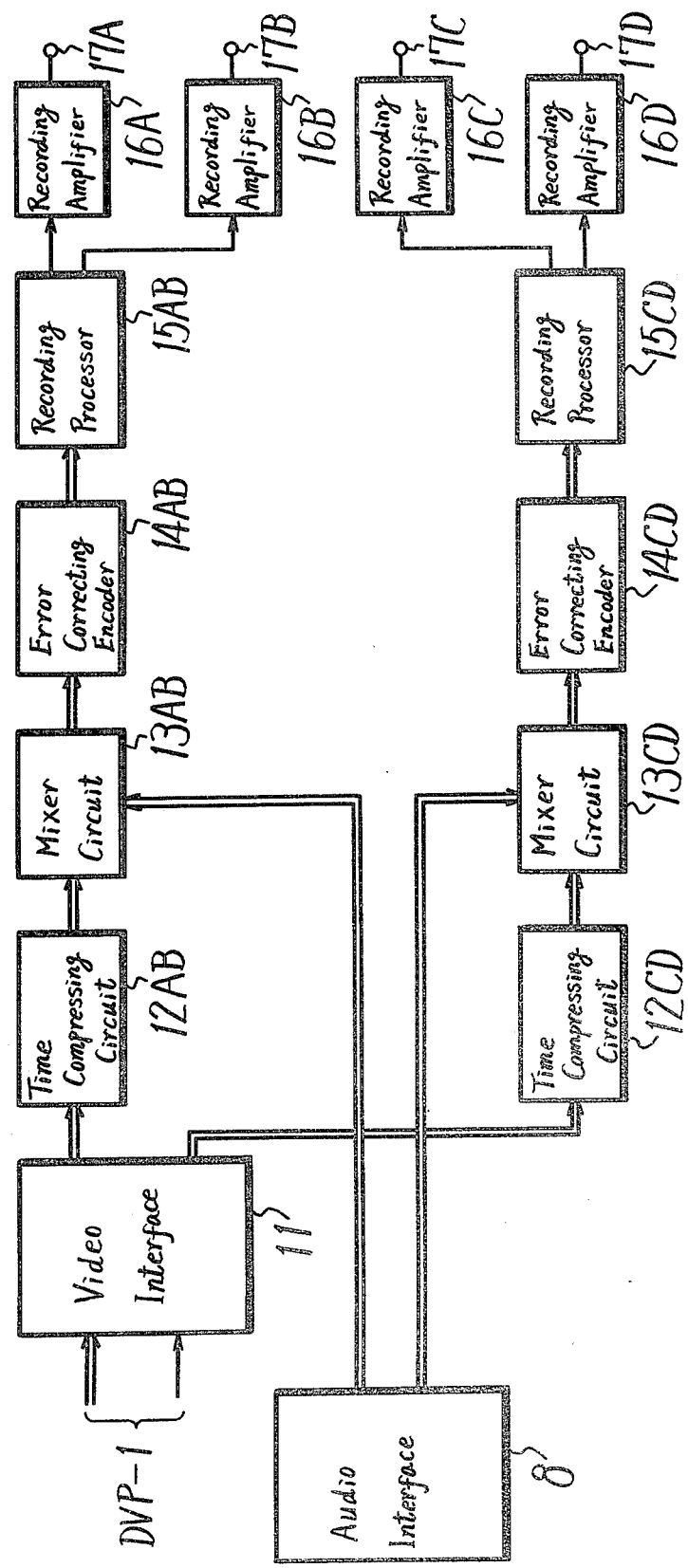
FIG. 2 is a block diagram of one embodiment of a digital recording processing circuit that can be used at the recording side of the digital video processor in the apparatus of FIG. 1.
Figure 3:
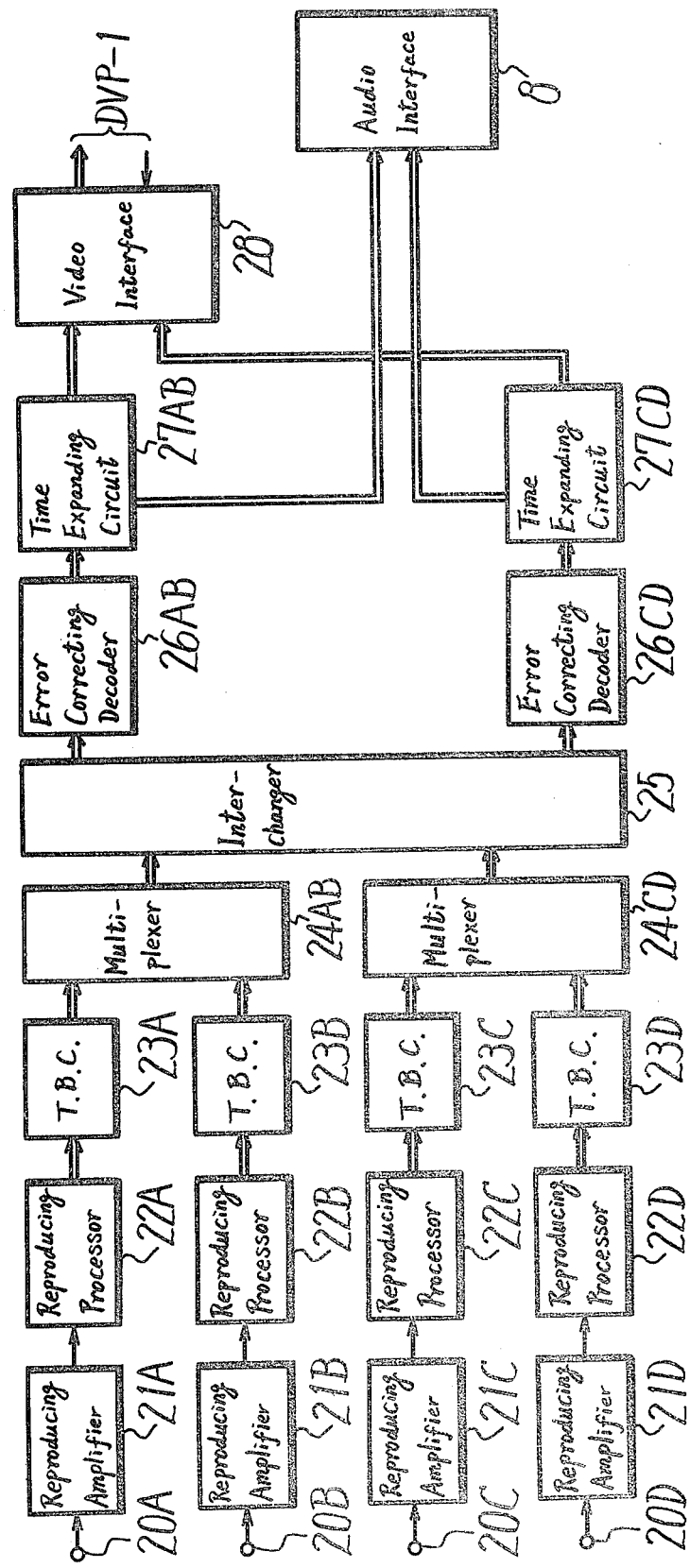
FIG. 3 is a block diagram of one embodiment of a digital reproducing processing circuit that can be used at the reproducing side thereof of the digital video processor in the apparatus of FIG. 1.
Figure 4:
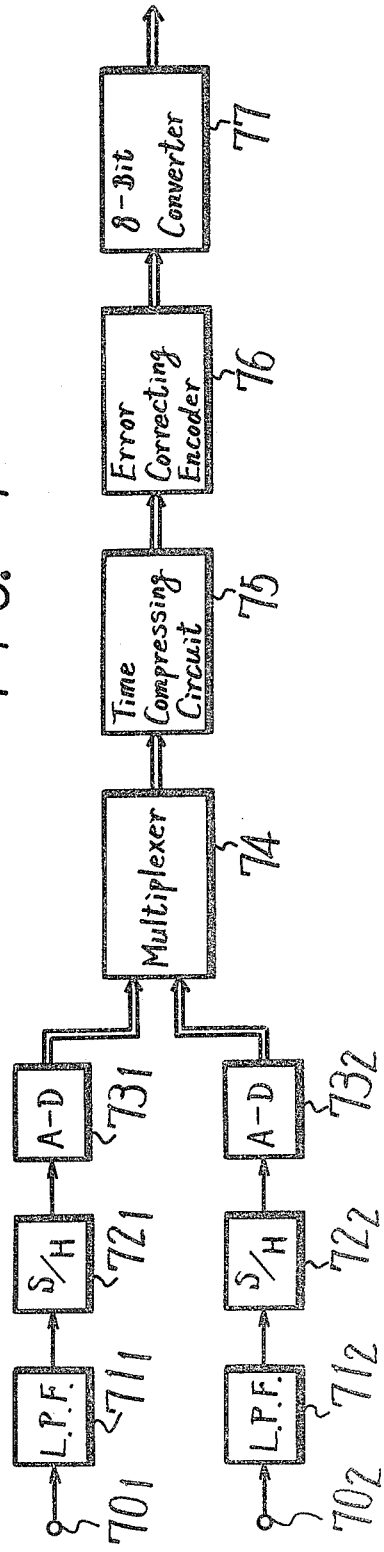
FIG. 4 is a block diagram of one embodiment of an audio signal recording processing circuit that can be used in the digital audio processor in the apparatus of FIG. 1.
Figure 5:
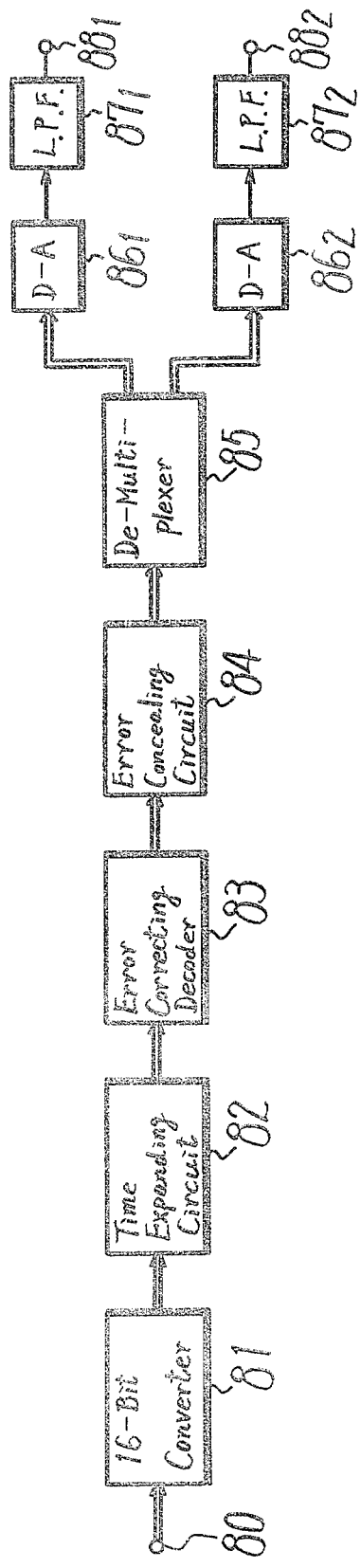
FIG. 5 is a block diagram of one embodiment of an audio signal reproducing processing circuit at the reproducing side thereof.

The second video processor DVP-2 used for recording in digital video processor 1 is constructed as shown in FIG. 2, and third video processor DVP-3 used for reproducing is constructed as shown in FIG. 3, respectively. Further, the record-processing circuit in digital audio processor 7 is constructed as shown in FIG. 4, and the reproduce-processing circuit thereof is constructed as shown in FIG. 5, respectively. In this case, FIGS. 4 and 5 each show an embodiment where only two audio channels are selected for the sake of simplicity.

When television camera 2 picks up an object (not shown), the color video signal from television camera 2 is supplied to first video processor DVP-1 of digital video processor 1, where it is sampled and digitized. In this case, each horizontal television line of the color video signal, with the exception of the horizontal sync (synchronizing) pulse HD and the burst signal BS is sampled and constitutes the effective region for the video signal. The vertical sync pulse and equalizing pulse portions in the color video signal of each field are not taken as part of the effective data region and the signal in that period is not recorded. However, since the test signals such as the VIR and VIT signals are inserted in the vertical fly-back period, the total effective number of video lines is determined including such signals. For example, in the case of an NTSC color video signal, the effective number of video lines in each television field period is selected as 256.

Further, in the described embodiment of the present invention, a sampling frequency $f_{VS}$ of the color video signal is selected as 4 times color subcarrier frequency $f_{SC}$. To The horizontal sync pulse HD and burst signal BS are extracted from the input color video signal and fed to a signal generator which produces a clock pulse signal which is synchronized to the burst signal BS and has a frequency of 4 $f_{SC}$. A sampling pulse is also generated based on this clock pulse signal.

The above effective portion of the color video signal is sampled in accordance with the above sampling pulse and is converted to a parallel 8-bit digital signal.

Figure 8:
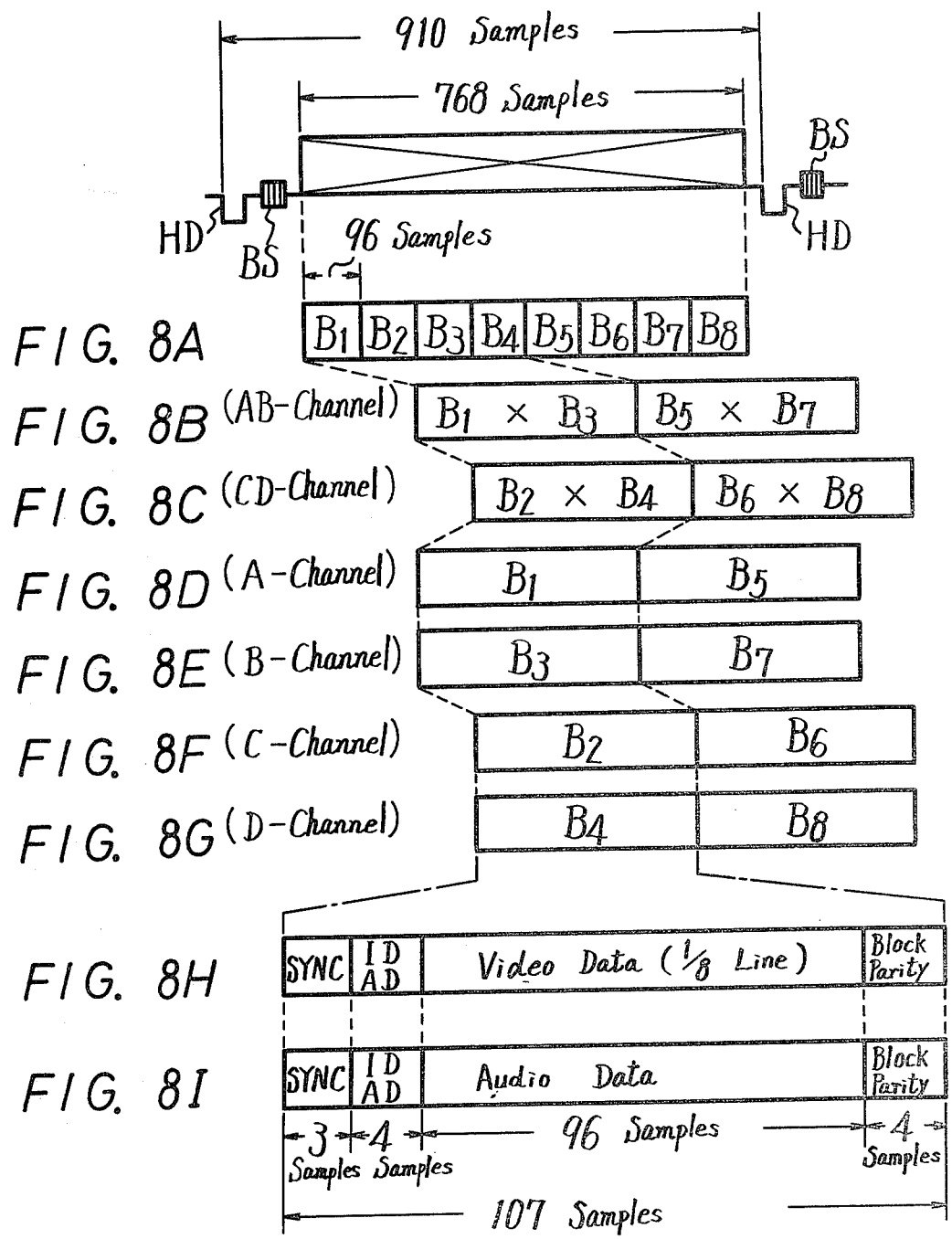
FIGS. 8A–8I and 9 are schematic diagrams used to explain the signal format when color video and audio signals are digitally recorded in accordance with this invention.

In this case, the sampling frequency $f_{VS}$ is 4 $f_{SC}$ and the color subcarrier frequency $f_{SC}$ in the case of an NTSC color video signal is expressed as follows:

$$f_{SC} = \frac{455}{2} f_H$$

where $f_H$ is the horizontal frequency. Therefore, the number of samples included in one horizontal period is 910 samples. However, since the signal in the horizontal blanking period is not sampled, as set forth above, the effective number of video samples in one horizontal line becomes less than 910 samples, for example, 768 samples (FIG. 8).

The digital video signal thus provided is fed to second video processor DVP-2. Further, based on the clock pulse signal, first video processor DVP-1 generates identification signals relating to the line, field, frame and track, and various kinds of timing signals. These identification signals and timing signals are also fed to second video processor DVP-2.

Analog audio signals collected by the microphones $M_1$ to $M_{16}$ are fed to digital audio processor 7. The input analog audio signals are processed by the recording-processing circuit of audio processor 7 shown in FIG. 4. As an example, taking the audio signals of two channels into consideration, the signals of the respective channels are supplied through input terminals $70_1$, $70_2$ and low pass filters $71_1$, $71_2$ to sample and hold circuits $72_1$, $72_2$, respectively. In this case, a sampling frequency $f_{AS}$ of the audio signal is selected as 50.4/1.001 KHz. In the case of an NTSC color video signal, in order to avoid a beat being produced between the audio subcarrier and color subcarrier, the frame frequency is selected higher than the conventional 30 Hz frame frequency by 1/1000 Hz, and when the audio signal is time-base compressed, the compression ratio is determined so that the sampling frequency, which is compressed, is an integer times the horizontal frequency $f_H$.

Now, the relation between the sampling frequency $f_{VS}$ of the video signal and the sampling frequency $f_{AS}$ of the audio signal will be explained.

$$f_{AS} = \frac{8}{7} \cdot \frac{14}{5} \cdot f_H \qquad (1)$$

$$= \frac{8}{7} \cdot \frac{14}{5} \cdot \frac{2}{455} \cdot f_{SC}$$

$$= \frac{32}{2275} \cdot f_{SC}$$

$$f_{VS} = 4 \cdot f_{SC} \qquad (2)$$

$$\therefore f_{AS} = \frac{8}{2275} \cdot f_{VS} \qquad (3)$$

The data thus sampled is fed fed to A-D converters $73_1$ and $73_2$, respectively, for converting the audio signals into parallel digital signals with 16 bits for each sample.

The digital signals from A-D converters 73₁ and 73₂ are fed to a multiplexer 74 and processed in a time-sharing-manner such that data of the first channel and data of the second channel appear alternatively for each sample. The output data from multiplexer 74 is then fed to a time compressing circuit 75 which includes a RAM (random access memory). The output data is interleaved data block by data block, and time compressed for making room for error detection and error correction codes in time compressing circuit 75, and then fed to an error correcting encoder 76 for adding error detecting codes and error correcting codes to the time-compressed data stream.

The parallel digital signal 16-bit from error correcting encoder 76 is fed to a 16-bit to 8-bit converting circuit 77 in which the 6-bit digital signal is separated to an upper 8 bit signal and lower 8 bit signal and a is then alternatively derived as a parallel 8-bit digital signal. The reason for such conversion of the audio signal is that since one sample of the digital video signal is a parallel 8-bit digital signal, the digital audio signal can be processed in a similar manner to the digital video signal.

The parallel 8-bit digital signal derived from digital audio processor 7 is fed to audio interface 8 where the 8-bit data is divided into two channels and then fed to second video processor DVP-2 of digital video processor 1.

The above description is given for the case of 2 channels, but in the case of 16 channels, the digital data of 16 channels of the audio signal are processed in a time sharing-manner in multiplexer 74.

As shown in FIG. 2, in second video processor DVP-2, the digital video signal, and various identification signals and timing signals from video processor DVP-1 are fed to a video interface 11, in which the digital video signal is separated so that the data of one television line is divided by four and recorded as 4 parallel tracks. In this embodiment, as shown in FIG. 8A, the data of one horizontal television line is separated into data of a former ½ line and the data of a latter ½ line, and the data of the former ½ line and the data of the latter ½ line are respectively divided by four to provide 8 data groups, that is, data groups B₁, B₂, . . . B₈ each having 96 samples of data. Then, the former 4 data groups B₁, B₂, B₃, B₄ are distributed to the tracks of respective channels A, B, C, D and recorded, and the latter 4 data groups B₅, B₆, B₇, B₈ are distributed to the tracks of the respective channels A, B, C, D and recorded. In particular, data groups B₁ and B₅ are recorded on a track T_A of the A channel, and similarly, data groups B₃, B₇; B₂, B₆ and B₄, B₈ are respectively recorded on tracks T_B, T_C and T_D of the B, C and D channels.

The reason for the above is as follows. In the case where data of one horizontal television line is distributed and recorded on 4 tracks as set forth above, it becomes necessary that the start of the data stream of the respective channels are arranged substantially at the same time. Therefore, a buffer memory for delaying the signal can be selected as small as possible so that a memory of a small capacity is used.

In the above embodiment, if the data which is divided into 4 channels is processed separately in respective channels, the 4 signal processing systems make the construction complicated and the cost relatively high. Therefore, the A-channel, B-channel C-channel, D-channel are respectively combined into two systems, that is, an AB-channel and a CD-channel, and the signals therein are then processed.

To this end, in video interface 11 the data rate is reduced by ½. Also, in the AB-channel as shown in FIG. 8B, the data groups B₁ and B₃ are multiplexed and processed in a time sharing manner such that the samples from data group B₁ and samples from data group B₃ are alternated. Then, data groups B₅ and B₇ are multiplexed and processed in a time sharing manner such that the samples from data group B₅ and the samples from data group B₇ are combined alternately. In the CD-channel, as shown in FIG. 8C, data groups B₂ and B₄ are multiplexed and processed in a time sharing manner and then data groups B₆ and B₈ are multiplexed and processed in a time sharing manner.

The digital signal in the AB-channel from video interface 11 is fed to a time base compressing circuit 12AB and the digital signal in the CD-channel is fed to a time base compressing circuit 12CD, respectively, where they are time-base-compressed with a predetermined ratio to make room for the digital audio data, error correcting codes, and data format conversion for recording.

If the data rate of the audio signal is given as $R_A$, the number of samples that can be included in one field with an 8-bit unit when the audio signal is converted into the 8-bit digital data sample format of the video signal will now be determined.

First, the data rate $R_A$ of the audio signal is calculated.

One sample of the audio signal includes 16 bits and there are 16 audio channels. Thus, if the redundancy of the error correcting code, sync signal and the like is taken as 100%, the total data rate $R_A$ is expressed as follows:

$$R_A = (16 \times 2) \times 16 \times f_{AS} \quad (4)$$

$$= \frac{4096}{2275} \cdot f_{VS}$$

$$= 25.779 \text{ M bit/s}$$

Accordingly, the number $N_A$ of samples of the digital audio signal inserted in each field is as follows:

$$N_A = R_A \times \frac{1}{8} \times \frac{1.001}{60} \quad (5)$$

$$= \frac{4096}{2275} \times 4 \times f_{SC} \times \frac{1}{8} \times \frac{1.001}{60}$$

$$= 53760$$

Since the number of video samples in one line is 910, as set forth previously, when the audio data rate is converted into the data rate of the digital video signal, the number of audio samples to be interposed in one television field is expressed as follows:

$$\frac{53760}{910} = 59.0769 \text{ (lines)} \quad (6)$$

In other words, about 60 lines are necessary.

Accordingly, since the effective number of video lines is 256, the audio signal data contains about ¼ the information content of the video signal data. Hence, the occupying ratio of the audio signal data in the total data of the video and audio signals is about 20%.

In this embodiment, digital audio data of two data blocks are inserted into each two lines of video data. For example, in the case of the AB-channel, after multiplexed data sub-blocks $B_1$ and $B_3$, and then $B_5$ and $B_7$, are repeated twice, digital audio data of $96 \times 2 = 192$ samples are inserted. It is to be appreciated, therefore, that when the video data is time-compressed, spaces for audio data are also provided, as described above.

The time-compressed digital data of the video signals of both the AB- and CD-channels are respectively fed to mixer circuits 13AB and 13CD to mix the video signal data with the audio signal data.

In particular, one of the digital signals for the 2-channel audio signal is delivered from audio interface 8 and is fed to mixer circuit 13AB, and the other digital audio signal is fed to the remaining mixer circuit 13CD. Thus, the digital audio signal data is inserted every 192 samples into the space provided in the digital video signal data sample stream by the above-mentiond compression operation.

The digital signals derived from mixer circuits 13AB and 13CD are respectively fed to error correcting encoders 14AB and 14CD and then to recording processors 15AB and 15CD. In error correcting encoders 14AB, 14CD and recording processors 15AB, 15CD, the video signal data which is multiplexed sample by sample is respectively processed for every sample in a time sharing manner. In other words, the samples of the same data groups in the respective data groups $B_1$, $B_2$, . . . $B_8$ are signal-processed within that sample unit and also the data rate thereof is reduced by $\frac{1}{2}$ (such that the rate is reduced down by $\frac{1}{4}$ in view of the original sample data), that is, in view of the signal processing shown in FIGS. 8D, 8E, 8F and 8G, the signal processing operation is separately carried out with the respective channels A, B, C and D.

Further, the audio signal data is also processed for every sample in a time sharing manner and is reduced down to $\frac{1}{2}$ its rate. Then, the audio signal data is distributed to A- and B-channels and C- and D-channels and processed similar to the video signal data.

Figure 9:
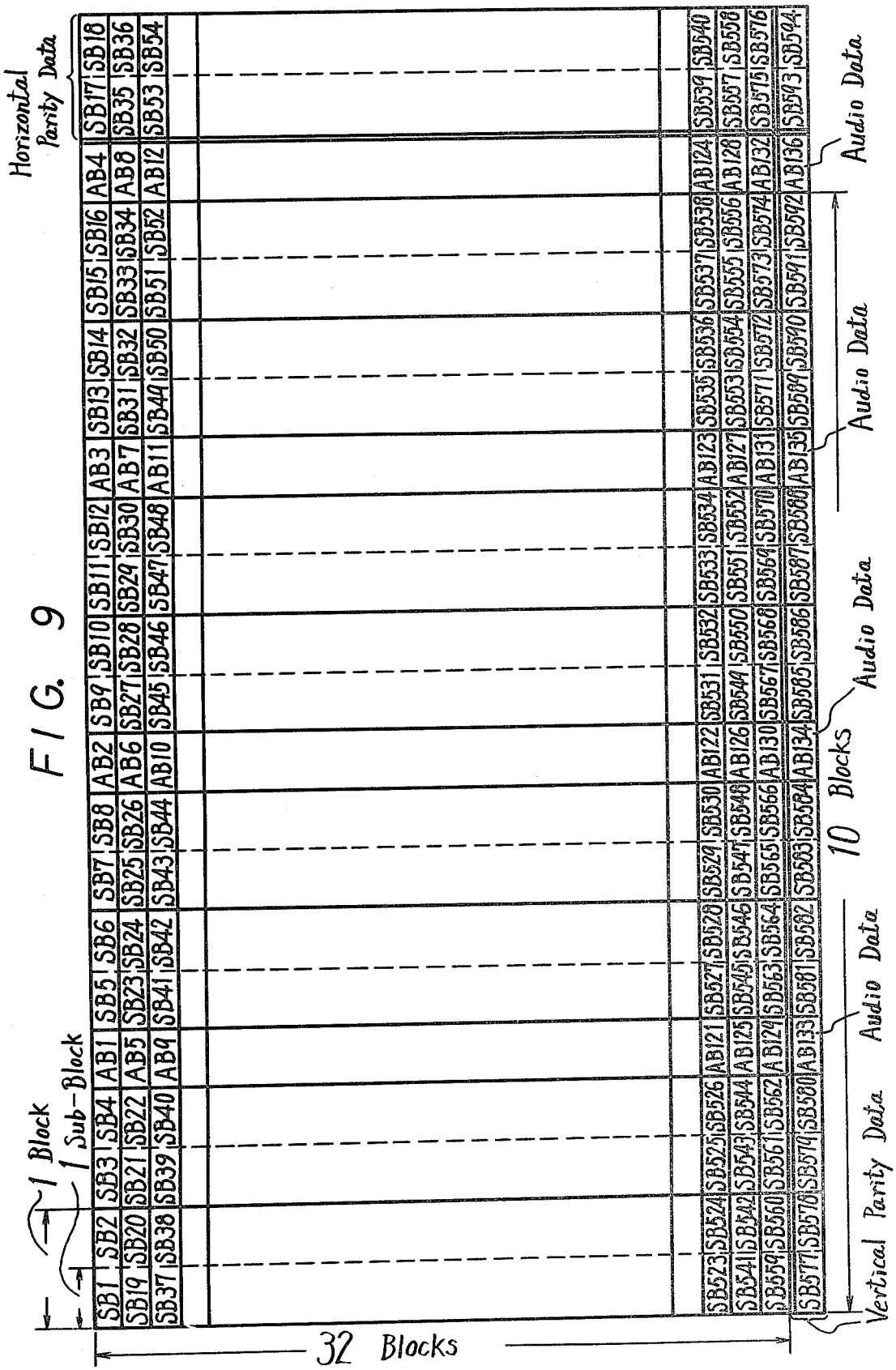

As described above, the video and audio signal data are processed in a time sharing manner in error correcting encoders 14AB, 14CD and recording processors 15AB, 15CD and converted into signals with the formats shown in FIGS. 8H, 8I and FIG. 9.

In other words, in the above embodiment, a video sub-block SB is assigned to every data group $B_1$, $B_2$, . . . $B_3$ (comprised of 96 samples), that is, every $\frac{1}{8}$ line of the video signal. As shown in FIG. 8H, each sub-block SB includes a block sync signal SYNC of 3 samples (24 bits) and an indentification signal ID and address signal AD of 4 samples (32bits) added before the video data, and also block parity data of 4 samples (32 bits) added ater the video data. In this case, the sync signal SYNC is used to extract the signals ID, AD, data and block parity data upon reproduction.

The identification signal ID shows which of the channels (tracks) A, B, C and D to which the signal belongs and whether the frame and field thereof is odd or even, and the address signal for each channel. The block parity data is used to detect an error in the data upon reproduction and also to correct an error in the data within one sub-block SB.

The audio signal is processed such that a sub-block AB thereof of the format similar to the video signal at every 96 samples (each sample including 8 bits) is provided, as shown in FIG. 8I.

Further, for each field of every channel, the data is processed to have the structure of FIG. 9 which shows the data structure of one channel of the video signal data and the audio signal data in one field, in which one block is formed of two of any combination of the sub-blocks SB and AB, that is, data from one line of the video signal ($\frac{1}{4}$ line).

In the case of an NTSC system color video signal, if the effective number of video lines is selected as 256, the number of video blocks in each field in each channel is 256. Since, however, one of the sub-blocks AB of the audio signal data follows after 4 sub-blocks SB of the video signal data, 10 blocks in the horizontal direction and 32 blocks in the vertical direction are arranged in a block unit matrix, parity data in the horizontal (row) direction are added to the $10 \times 32$ matrix at an 11th column, and parity data in the vertical (column) direction are added to the matrix at a 33rd row, so that there are totally $11 \times 33$ blocks.

Further, in this case, if it is assumed that sub-blocks SB are produced from $SB_1$ to $SB_{594}$ sequentially and sub-blocks AB of the audio signal are produced from $AB_1$ to $AB_{136}$, with resepect to the first row, the following modulo-2 additions are performed with the sub-block units at every other sub-block in the horizontal direction to thereby provide horizontal parity data $SB_{17}$ and $SB_{18}$ of the first row.

$$SB_1 \oplus SB_3 \oplus AB_1 \oplus \ldots \oplus SB_{16} = SB_{17}$$

$$SB_2 \oplus SB_4 \oplus SB_5 \oplus \ldots \oplus AB_4 = SB_{18}$$

Similarly, horizontal parity data on the 2nd to 33th rows are provided.

As to only the sub-blocks SB of the video signal, in the first column the following modulo-2 additions are carried out in the vertical direction to provide vertical parity data $SB_{577}$ and $SB_{578}$ of the first column.

$$SB_1 \oplus SB_{19} \oplus SB_{37} \oplus \ldots \oplus SB_{559} = SB_{577}$$

$$SB_2 \oplus SB_{20} \oplus SB_{38} \oplus \ldots \oplus SB_{560} = SB_{578}$$

Similarly, vertical parity data in the 2nd to 11th columns are provided on only the sub-blocks SB of the video signal.

Thus, horizontal and vertical parity data are used to enhance the data error correcting ability upon reproduction.

The signal processing to provide the above horizontal and vertical parity data and add the same to the data is performed in error correcting encoders 14AB and 14CD, while the signal processing to provide the sync signal SYNC, identifying signal ID and address signal AD and add the same to the data is performed in recording processors 15AB and 15Cd.

In processors 15AB and 15CD, a block-encoding operation is carried out such that the number of bits per sample is converted from 8 bits to 10 bits. This block-encoding operation is such that $2^8$ 8-bits codes whose DSV (Digital Sum Variation) is 0 or close to 0 are selected in 1:1 correspondence from $2^{10}$ codes of 10 bits. In other words, the ten-bit codes are selected such that the DSV of the recording signal becomes as near to zero as possible and accordingly "0" and "1" appear substantially homogeneous, that is alternate as much as possible. Such block-coding is carried out when recording digital data, because DC components can not be recovered upon reproduction in a magnetic recording and reproducing system.

Thus, a 10-bit block encoded digital signal is further converted in processors 15AB and 15CD from a parallel signal to a series signal in sequence from sun-block $SB_1$. Further, at the beginning and trailing end of the digital signal for one field period of each channel, a pre-amble signal and a post-amble signal are added, respectively.

The serial digital signals are separated for each channel, delivered from processors 15AB, 15CD through recording amplifiers 16A, 16B, 16C and 16D to output terminals 17A, 17B, 17C and 17D, respectively.

Figure 6A:
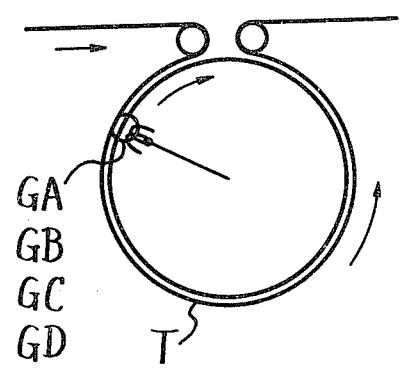
FIGS. 6A and 6B are schematic plan views of a rotary magnetic head assembly that can be used with the VTR according to this invention.
Figure 6B:
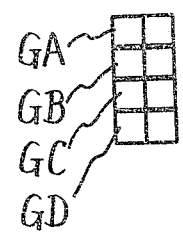

The digital signals of 4 channels thus derived from video processor DVP-2 are supplied to, for example, VTR 3 or 4. Each of VTRs 3 and 4 has 4 rotary magnetic heads GA, GB, GC and GD, as shown in FIGS. 6A and 6B. These 4 heads GA, GB, GC and GD are located closely and sequentially displaced along the rotary axis approximately in-line. They are rotated at the field frequency of 60 Hz in synchronism with the color video signal. A magnetic tape T is helically wrapped around the rotary surface of a guide drum assembly containing heads GA, GB, GC and GD in an $\Omega$-shape and is also transported at a constant speed.

Figure 7:
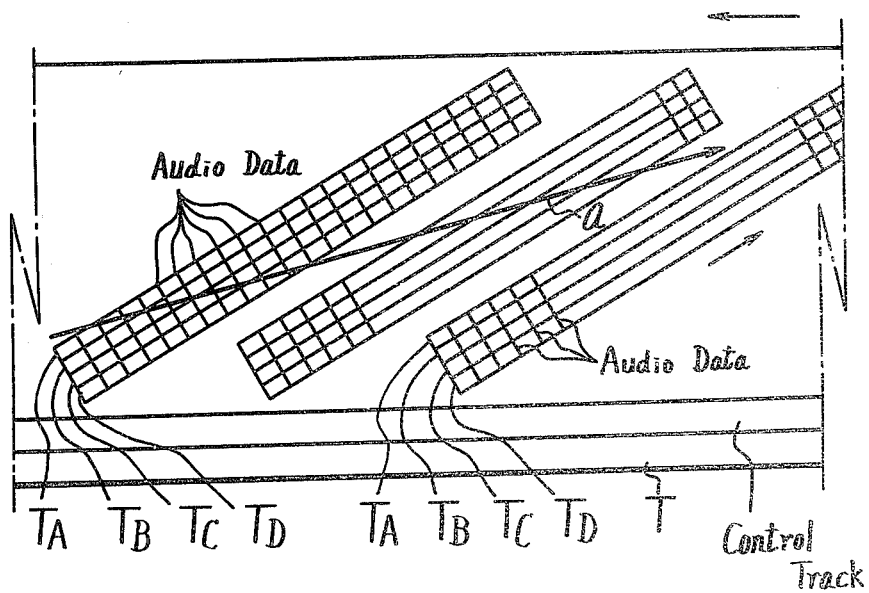
FIG. 7 is a schematic diagram of a track pattern recorded on a portion of magnetic tape according to this invention.

If the digital signals of 4 channels, for example, the A to D channels are supplied to VTR 3, as shown in FIG. 7, the digital signals of the A-, B-, C- and D-channels are respectively recorded in VTR 3 by heads GA, GB, GC and GD on tape T as 4 slant tracks $T_A$, $T_B$, $T_C$ and $T_D$ for every field. In this embodiment, the track widths of heads GA, GB, GC and GD and the distance between adjacent ones thereof are selected so that a set of tracks $T_A$, $T_B$, $T_C$ and $T_D$ correspond to one video field with the SMPTE "C" format.

In practice, it is difficult to precisely arrange 4 heads in an in-line relation so that the effect of leakage fluxe from adjacent heads is negligible. Thus, the 4 heads GA, GB, GC and GD are sequentially dislocated in the rotary direction. In this case, the record starting positions of the respective tracks $T_A$, $T_B$, $T_C$ and $T_D$ are not theoretically aligned. However, if the digital signals of the 4 channels or A- to D-channels are respectively given with relative delays when they are supplied to the heads GA, GB, GC and GD upon recording, the track pattern on tape T can be formed similar to those formed by the 4 heads arranged in an in-line manner as shown in FIG. 7.

As described above, the color video signal and associated audio signal can be recorded in digital form.

Since the number of samples of the audio signal data for each field is 53760 samples as set forth above, 13440 samples exist for each track. Thus, in the above case, audio signal data for each field of each channel includes 4 sub-blocks in the horizontal direction and 33 sub-blocks in the vertical direction for a total of 132 sub-blocks. Accordingly, since the number of samples for one sub-block is 107 samples, the total number of samples of the audio signal that can be recorded is $107 \times 132 = 14124$ samples for each track or channel. Therefore, it can be understood that there is a sufficient region for recording the audio signal data.

Now, reproduction of the digital signal recorded as above will be explained.

When VTR 3 is changed to a reproducing mode, the digital data of the respective channels are reproduced substantially at the same time by heads GA, GB, GC and GD from tracks $T_A$, $T_B$, $T_C$ and $T_D$ and then fed to third video processor DVP-3 of digital video processor 1. In this case, if heads GA, GB, GC and GD are sequentially dislocated in the rotating direction as set forth above, the digital signals of the respective channels are reproduced in a sequentially delayed state. This delay among the data of 4 channels can easily be corrected in video processor DVP-3.

As shown in FIG. 3, in video processor DVP-3 the digital signals applied to input terminals 20A, 20B, 20C and 20D thereof are respectively supplied through reproducing amplifiers 21A, 21B, 21C and 21D to reproducing processors 22A, 22B, 22C and 22D in which they are respectively converted from a serial signal to a parallel signal and also block-decoded from its 10-bit code to the original 8-bit code. Also, a clock signal is generated by a phase locked loop (PLL) based on the reproduced digital signal.

The parallel 8-bit digital signals are respectively fed to TBCs (time base correctors) 23A, 23B, 23C and 23D for removing any time base fluctuation components therein. As well known, TBCs 23A, 23B, 23C and 23D each include a digital memory, the block sync signal SYNC is used to detect the start of the following data signal, and the writing operation to each memory is carried out based on the clock signal from processors 22A, 22B, 22C and 22D. The reading operation from the digital memory is performed by the clock signal provided based on a reference sync signal, whereby time base fluctuation components are removed.

The data signals from TBCs 22A and 22B are both fed to multiplexer 24AB, and the data signals from TBCs 22C and 22D are both fed to multiplexer 24CD. Then, in multiplexer 24AB, digital data of the A-channel and B-channel are alternatively mixed sample by sample, and in multiplexer 24CD, digital data of the C-channel and D-channel are also alternatively mixed sample by sample.

The digital data from multiplexers 24AB and 24CD are each applied through an interchanger 25 to error correcting decoders 26AB and 26CD. In interchanger 25, the respective channels are identified by the track indentification signals among the identification signals added to the respective sub-blocks, and the sub-block data is distributed to the corresponding channels. In interchanger 25, the process is, of course, carried out in a time sharing manner.

The interchanger 25 operates effectively in a special reproducing mode. In particular, during a normal reproducing mode where the position of the record track on the magnetic tape and the running trace of the rotary heads thereon are coincident, the 4 rotary heads reproduce the recorded signals only from the corresponding tracks. However, during a special reproducing mode, such as a high speed reproducing mode where the running speed of the magnetic tape is selected as several ten times that of the normal reproducing speed, the rotary heads scan across a plurality of the tracks, as shown in FIG. 7 by arrow a. Therefore, the respective heads GA, GB, GC and GD each reproduce a signal comprised of a mixture of signals from the A-, B-, C- and D-channels.

In the above case, interchanger 25 discriminates the channel identification of the reproduced data, and the data signals from tracks $T_A$ and $T_B$ are both fed to decoder 26AB for the AB-channel and the reproduced data signals from tracks $T_C$ and $T_D$ are both fed to decoder 26CD for the CD-channel.

The decoders 26AB and 26CD each include a field memory having a capacity to memorize the data of one channel of one field. Thus, the data of the A- and B- channels and the data of the C- and D-channels are respectively processed in decoders 26AB and 26CD in a time sharing manner such that data written in the field memory for each sub-block SB in response to the respective address signal AD, and simultaneously, any error in the data is corrected by the block parity data and horizontal and vertical parity data. As to the error correction, the error within each sub-block is first corrected by the block parity data, then error correction by the horizontal parity data is achieved, and finally error correction by the vertical parity data is achieved.

Thus, error corrected data is respectively applied to time base expanding circuits 27AB and 27CD, in which the audio and video signal data are respectively separated. Further, such separated audio data is time-expanded for every channel and recovered to the original signal format.

The video signal data from time base expanding circuits 27AB and 27CD are both fed to a video interface 28, and converted into the original single channel digital data. The data is then fed to first processor DVP-1. In video processor DVP-1, the digital signal is D-A converted, further added with the sync pulse signal and color burst signal to reform the original color video signal, and then fed to, for example, monitor television receiver 5. In addition various timing pulses generated based upon the reference clock pulse, signal derived from the signal generator in processor DVP-1 are also respectively supplied through the video interface 28 to respective circuits of the reproducing processor circuits.

In the above reproducing system, the data processing from heads GA, GB, GC and GD to the write-in side of TBCs 23A, 23B, 23C and 23D uses the clock pulse signal extracted from the reproduced data, but the data processing from the read-out side of TBCs 23A, 23B, 23C and 23D to the output terminals uses the clock pulse signal derived from the signal generator in processor DVP-1.

The audio signal data, which is respectively separated and derived from the input sides of time base expanding circuits 27AB and 27CD, are both fed to audio interface 8 in which the data of 2 channels is recovered to the data of a single channel.

The data from audio interface 8 is fed through an input terminal 80 (refer to FIG. 5) of digital audio processor 7 to an 8-bit to 16-bit converter 81 in which the data is converted to the original parallel digital audio signal of 16 bits for each sample. The 16-bit digital signal from converter 81 is fed to a time base expanding circuit 82, where the audio signals are de-interleaved to the original code arrangement having the original time base. The digital signal thus processed is then fed to an error correcting decoder 83, where any errors thereof are corrected based on the error detecting code and the error correcting code.

When any error in the data can not be corrected in error correcting decoder 83, the digital data signal is fed to an error concealing circuit 84 in which the remaining error is concealed by a mean value interpolation using the mean value of words before and after the erroneous word or pre-value hold interpolation.

Thus, error corrected and concealed digital signals are fed to a de-multiplexer 85 in which the signal is distributed to the original first and second channel signals. The first channel signal is fed to a D-A converter $86_1$ and converted into an analog signal which is delivered through a low pass filter $87_1$ to an output terminal $88_1$, while the second channel signal is fed to a D-A converter $86_2$, converted into an analog signal and delivered through a low pass filter $87_2$ to an output terminal $88_2$.

The above description is given for the case of 2 channels, but the above reproducing system can be applied to the case of 16 channels with the same process except that the digital signal is distributed to 16 channels by de-multiplexer 85.

The analog audio signals of the respective channels thus obtained from digital audio processor 7 are respectively supplied to speakers $SP_1$, $SP_2$, . . . $SP_{16}$. In the above manner, the digital video and audio signals can be reproduced.

During reproduction, the number of sub-blocks having an error is indicated on monitor receiver 6 by analyzer ANA in digital video processor 1.

Figure 10:
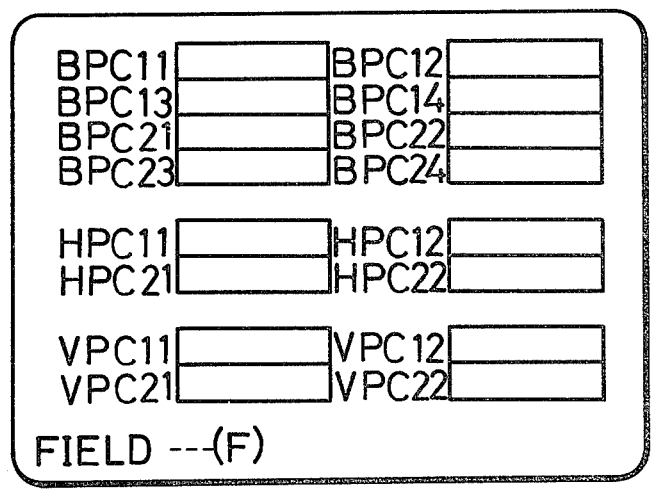
FIG. 10 is a schematic diagram of one embodiment of an error display that can be used in the apparatus of FIG. 1.

FIG. 10 illustrates the display format of monitor receiver 6 on which, by way of example, the number of sub-blocks having errors is indicated. In the figure within each of the boxes, for example, 10 figures in decimal number can be displayed to display the number of erroneous sub-blocks. The letters marked at the left side of each of the boxes are index numbers which show the display status, that is, the following are respectively displayed in the frames or boxes.

(i) The letters BPC11, BPC12, BPC21 and BPC22 represent the numbers of erroneous sub-blocks which will appear in the first channel to fourth channel.

(ii) The letters BPC13, BPC14, BPC23 and BPC24 represent the numbers of erroneous sub-blocks of the respective channel which can not be corrected by the block parity data.

(iii) The letters HPC11, HPC12, HPC21 and HPC22 represent the numbers of erroneous sub-blocks after the error is corrected by the horizontal parity data.

(iv) The letters VPC11, VPC12, VPC21 and VPC22 represent the numbers of erroneous sub-blocks after the error is corrected by the vertical parity data.

In FIG. 10, the letters FIELD . . . (F) represent that the displayed number of erroneous sub-blocks is obtained over F fields. For example, if "FIELD . . . (60)" is displayed, it represents that the number of sub-blocks displayed is obtained from data of 60 fields.

When a dubbing or editing operation is required between VTRs 3 and 4, error correcting decoders 26AB and 26CD of reproducing processor DVP-3 and error correcting encoders 14AB and 14CD of recording processor DVP-2 are respectively by-passed, and also the D-A converter and A-D converter of processor DVP-1 are by-passed.

A tracking servo for a conventional VTR is sufficient for use in VTRs 3 and 4 when they are in the recording and reproducing modes.

In the above described embodiment of the invention the horizontal parity data is generated by also using the digital audio signal delivered from digital audio processor 7 for improving the error correcting ability. However, the digital audio signal delivered from processor 7 is already added with the error detecting and correcting codes, and it is therefore not always necessary to add horizontal parity data to the digital audio signal.

If no horizontal parity data is provided for the data including the digital audio signal, the following process can be used when the digital audio signal is mixed into the digital video signal.

Figure 11:
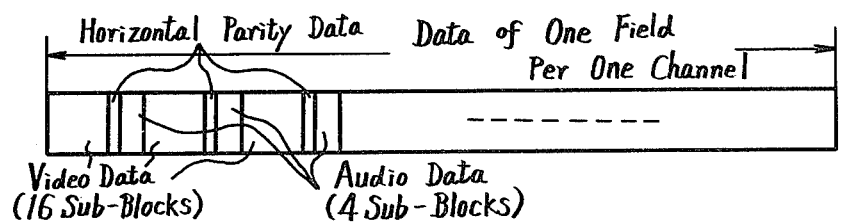
FIGS. 11 to 13 are schematic diagrams used to explain other embodiments of the invention.
Figure 12:
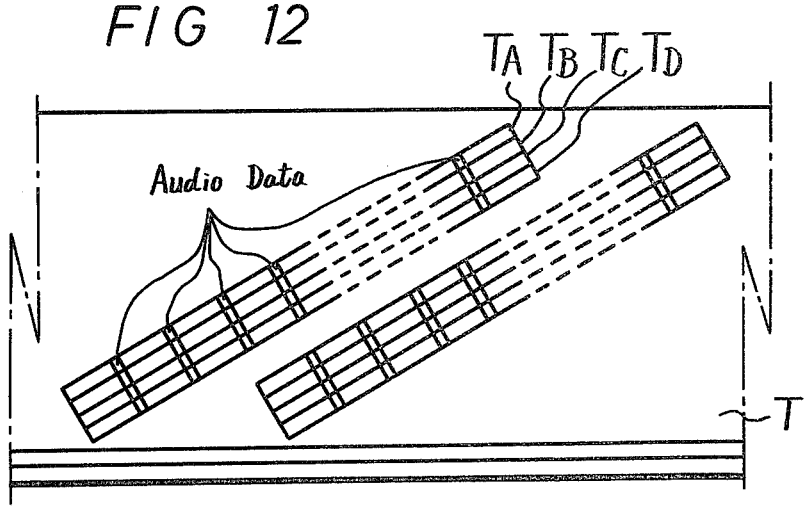
Figure 13:
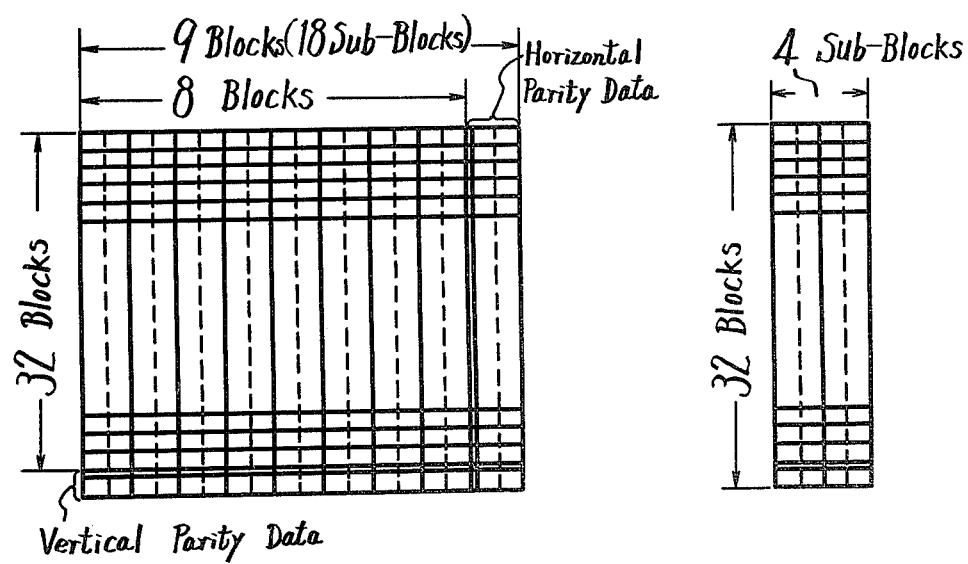

In particular, in the example of FIG. 11, in each field for each channel, 4 sub-blocks (2 blocks) of audio data this is repeated four times, follow after 9 blocks of video data, and the last block of the video data is horizontal parity data. Accordingly, the track pattern thereof becomes such that the data of the audio signal is distributed to and recorded in one track, that is, the audio signal data exists in one track in a scattered state, as shown in FIG. 12. In this case, the data structure of one channel in one field becomes as shown in FIG. 13 and the error correction carried out in decoders 26AB and 26CD is performed on the data of the video signal.

As described above, according to the present invention, the video signal and the audio signal are mixed, processed by the same signal processor, recorded in one track with the video and audio signals being mixed thereon, and then the recorded signals are reproduced. Therefore, there is of no need to provide a separate head for the audio signal. Further since the error correcting encoder and decoder for the video signal data can be used for the audio signal data, the error correcting ability on the audio signal data can be improved.

Also, as shown in the track patterns of FIGS. 7 and 12, when the audio signal data is distributed in one track and then recorded thereon, drop-out of the audio signal data has less influence on the reproduced signal.

According to the present invention, since the audio signal is recorded in 4 tracks in the same condition, even when the heads scan a plurality of oblique tracks, as in the case of an abnormal or special reproducing mode, equivalent signals can be derived from the respective heads and hence the signal processing becomes easy.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim as our invention:

1. Digitized video and audio data recording and/or reproducing apparatus, comprising:
   a tape guide drum assembly having a periphery about which a magnetic tape is adapted to be helically transported at a predetermined wrap angle;
   at least one rotary magnetic head associated with said tape guide drum assembly for recording digitized video and audio data on said tape;
   time compressing means for time compressing said digitized audio and video data;
   multiplexing means for intermixing said time compressed digitized audio data and video data in a time sharing manner to form an intermixed signal;
   processing means for processing both said audio data and video data by processing said intermixed signal; and
   distributing means for supplying said processed intermixed signal to said at least one rotary magnetic head.

2. Digitized audio and video data recording and/or reproducing apparatus as claimed in claim 1, wherein said at least one rotary magnetic head forms a plurality of recording tracks on said tape, and each track includes digitized audio data intermixed with said digitized video data.

3. Digitized audio and video data recording and/or reproducing apparatus as claimed in claim 1, wherein said magnetic tape includes a plurality of recording tracks thereon, with each track including a first predetermined number of sub-blocks of said digitized video data, and each track includes digitized audio data following a second predetermined number of sub-blocks of said digitized video data which is less than said first predetermined number.

4. Digitized audio and video data recording and/or reproducing apparatus as claimed in claim 2, further including means for generating error correction codes for recovering original data upon reproduction and adding said codes to the combined audio and video data intermixed signal.

5. Information signal recording apparatus comprising:
   converting means for converting an audio signal and a video signal into digital form;
   multiplexing means for intermixing said digitized audio signal and said digitized video signal in a time sharing manner to form an intermixed signal;
   processing means for processing both said audio and video signal by processing said intermixed signal; and
   transducer means for recording said processed intermixed signal on a record medium.

6. Apparatus according to claim 5; in which said processing means includes means for generating error correction code signals from said intermixed signal and for adding said error correction code signals to said intermixed signal.

7. Apparatus according to claim 5; in which said transducer means includes a plurality of magnetic heads for recording said processed intermixed signal in a plurality of record tracks on a magnetic tape.

8. Apparatus according to claim 5; further including compressing means for compressing said digitized video signal and said digitized audio signal from said converting means.

9. Information signal reproducing apparatus comprising:
   transducer means for reproducing an intermixed signal which is formed by intermixing a time compressed digitized audio signal and a time compressed digitized video signal in a time sharing manner and which is recorded on a record medium;
   processing means for processing both said audio signal and video signal by processing said reproduced intermixed signal; and
   separating means for separating said digitized video signal and said digitized audio signal from said processed intermixed signal.

10. Apparatus according to claim 9; in which said processing means includes time base correction means for correcting time base errors in said reproduced intermixed signal; and error correcting means for correcting errors in said reproduced intermixed signal.

11. Apparatus according to claim 9; in which said separating means includes time base expanding means for separating said digitized audio signal and said digitized video signal from said processed intermixed signal and for expanding the time base of said separated signals.

* * * * *